Patented Jan. 3, 1933

1,892,972

UNITED STATES PATENT OFFICE

OLIVER M. URBAIN, OF COLUMBUS, OHIO, ASSIGNOR TO CHARLES H. LEWIS, OF HARPSTER, OHIO

WATER PURIFICATION PROCESS

No Drawing.   Application filed October 12, 1931.   Serial No. 568,523.

This invention relates to the art of water purification and comprehends a process for removing certain contaminating substances therefrom.

It is a specific object of the invention to provide a process for the removal of aldehydes and ketones from water. These substances have a substantial biochemical oxygen demand and are thus very polluting in character.

The aldehydes have a greater biochemical oxygen demand than the ketones which is as we would expect as the aldehydes are more reactive. The ten day biochemical oxygen demand at 20° C. of some of the more common ketones and aldehydes are given in the following table. The values for biochemical oxygen demand are for solutions of the aldehydes and ketones containing 10 ppm.

| Substance | B. O. D. |
|---|---|
| Ketones: | |
| Furfural acetone | 2.2 |
| Galactose | 4.5 |
| Di N butyl ketone | 2.8 |
| Aldehydes: | |
| Benzaldehyde | 12.0 |
| Crotonaldehyde | 9.4 |
| Acetaldehyde | 12.0 |

The aldehydes have the general formula $R—CHO$ (where R equals H or any hydrocarbon radical, either substituted or unsubstituted).

The ketones contain the carbonyl grouping $>C=O$ as do the aldehydes. The aldehydes have one of the free valences of the $>C=O$ group replaced by a hydrocarbon radical, the other free valence being bound to hydrogen. Ketones have both free valences bound to hydrocarbon radicals, i. e.

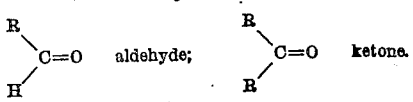

The reagent which is employed in the process to effect removal of the aldehydes and ketones from water solutions is hydrazine or its substituted derivatives which have two replaceable hydrogen atoms bound to one nitrogen atom.

The reaction takes place in a solution slightly alkaline with ammonia. There should be present from 10 to 20 ppm of an ammonium salt or ammonium hydroxide. Examples of reactions are as follows:—

(1) $R-CHO + C_6H_5NH.NH_2 =$
    aldehyde   phenylhydrazine

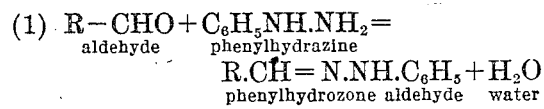

(2) $2R-CHONH.NH =$
    aldehyde hydrazine

The phenylhydrazine used in the first reaction is a substituted derivative of hydrazine while in the second reaction we use the pure hydrazine. The end products are insoluble in water.

Examples of the hydrazines which may be used are given as follows:—

Phenylhydrazine—$C_6H_5NH.NH_2$ o; m or p-tolylhydrazine—
$CH_3C_6H_4.NH.NH_2$ p-nitrophenylhydrazine—
$C_2N.C_6H_4.NH.NH_2$ 1 or 2-naphthylhydrazine—$C_{10}H_7NH.NH_2$ The compound formed by the above examplary reactions is colloidal when solutions containing only a few parts per million of the aldehyde or ketone are treated. When, however, more concentrated solutions are treated, the compound formed precipitates readily. While the compounds are soluble in strong alkali, they are insoluble in calcium hydroxide solutions having a pH below 11.0.

In adapting this process to any waste it is first necessary to know the aldehyde and ketone content of the waste. Then to determine the amount of ammonium salts or ammonium hydroxide present in the waste. All putrefying organic wastes contain ammonium salts and many free ammonia. In most cases it will be unnecessary to add the ammonia which functions as a catalyst as it will be found to be present. For example, even the weak municipal sewages contain ammonium salts equivalent to from 10 to 25 ppm of ammonium hydroxide. When the content of aldehyde and ketone is known, it then is only necessary to add the equivalent reactive amounts of the precipitant.

The process, it will be observed, enables the successful removal of contaminating aldehydes and ketones from water solutions containing such substances. The foregoing description is merely illustrative, the invention being restricted only by the scope of the appended claims.

What I claim as my invention is:

1. A process for removing aldehydes from water solutions comprising treating the solution with hydrazine in the presence of ammonia or ammonium salt.

2. A process for removing aldehydes from water solutions comprising treating the solution with hydrazine or a derivative thereof having two replaceable hydrogen atoms bound to one nitrogen atom in the presence of ammonia or ammonium salt.

3. A process for removing ketones from water solutions comprising treating the solution with hydrazine in the presence of ammonia or ammonium salt.

4. A process for removing ketones from water solutions comprising treating the solution with hydrazine or a derivative thereof having two replaceable hydrogen atoms bound to one nitrogen atom in the presence of ammonia or ammonium salt.

5. A process for removing aldehydes and ketones from water solutions comprising maintaining the solution slightly alkaline with ammonia and incorporating therein a quantity of hydrazine or a derivative thereof having two replaceable hydrogen atoms bound to one nitrogen atom in an amount adequate to react with the aldehydes and ketones and form a precipitate.

OLIVER M. URBAIN.